United States Patent [19]

Hosmer

[11] 4,104,825
[45] Aug. 8, 1978

[54] VENT

[75] Inventor: Stephen L. Hosmer, Englewood, Colo.

[73] Assignee: Young Windows Inc., Conshohocken, Pa.

[21] Appl. No.: 733,430

[22] Filed: Oct. 18, 1976

[51] Int. Cl.² .................. E05F 11/00; E05D 7/00
[52] U.S. Cl. ................................ 49/324; 98/2.14; 49/397; 49/465; 160/369; 296/137 B
[58] Field of Search .............. 49/342, 343, 344, 345, 49/346, 324, 465, 466, 397; 296/137 R, 137 B; 98/2.14; 160/369

[56] References Cited

U.S. PATENT DOCUMENTS

| | | | |
|---|---|---|---|
| 2,022,036 | 11/1935 | Haberstump | 49/346 X |
| 2,173,890 | 9/1939 | Tuttle | 49/345 X |
| 2,525,177 | 8/1970 | Robinson | 49/397 X |
| 2,720,260 | 10/1955 | Plucinski | 160/369 X |
| 2,777,687 | 1/1957 | Jewett et al. | 49/342 X |
| 2,801,845 | 8/1957 | Rodaway | 49/342 |
| 3,934,383 | 1/1976 | Perry et al. | 49/342 X |
| 3,974,753 | 8/1976 | Blomgren et al. | 49/397 X |

Primary Examiner—Philip C. Kannan
Attorney, Agent, or Firm—Frederick J. Olsson

[57] ABSTRACT

A fixed frame mounted on a housing and a vent frame hinged to the fixed frame. The vent frame is moved between closed and open positions by a single-handle double operator actuated from the interior of the housing. The hinge and operator apply forces to create a continuous water seal in the closed position. The seal and hinge prevent rattle of the vent frame.

18 Claims, 21 Drawing Figures

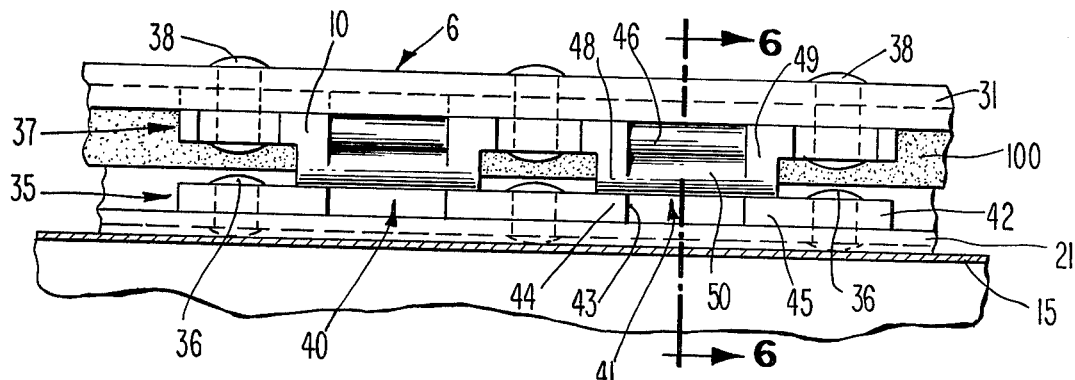
Fig. 5
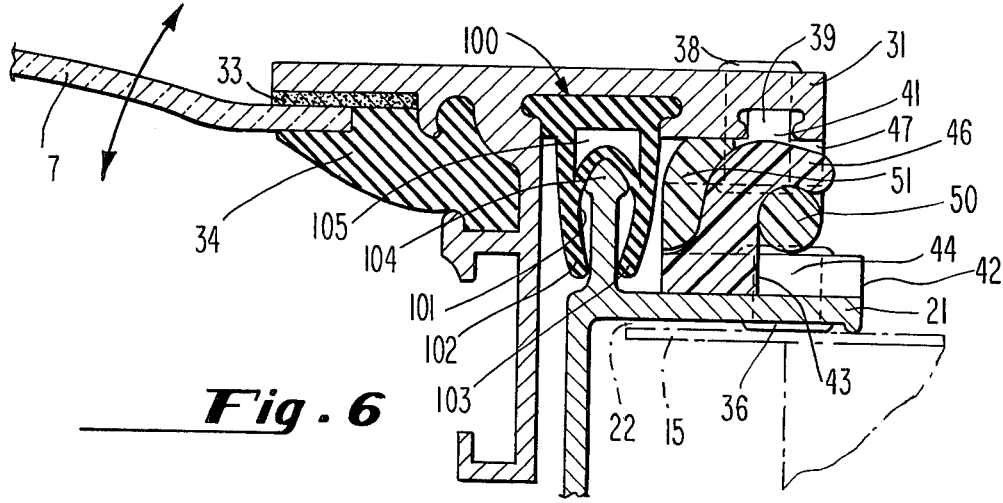
Fig. 6
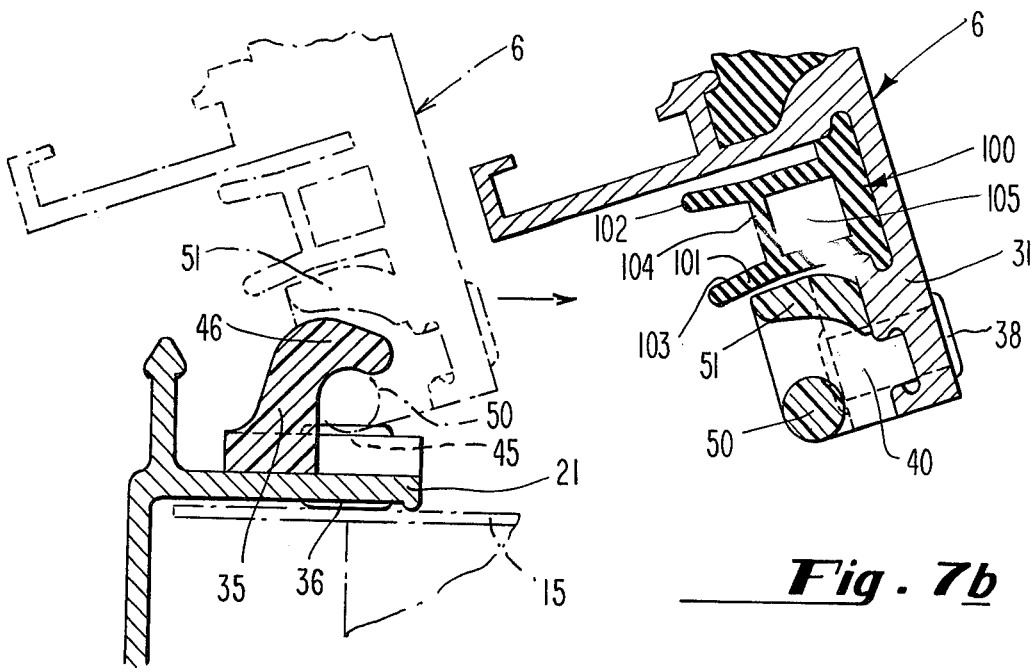
Fig. 7a
Fig. 7b

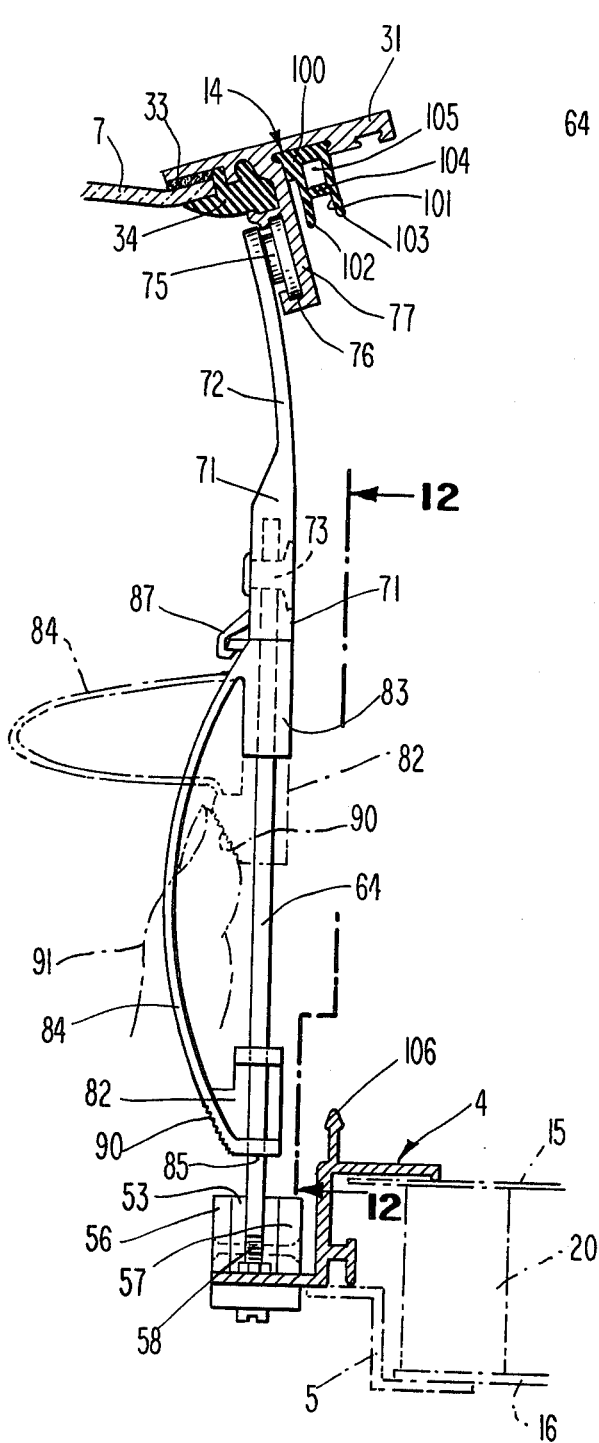
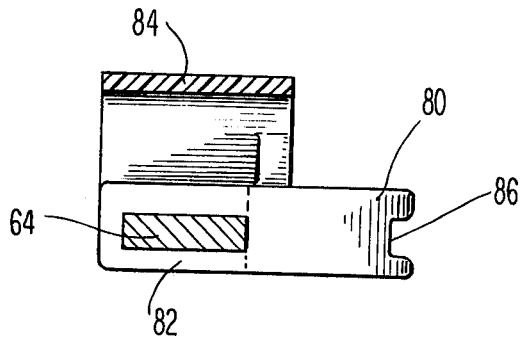
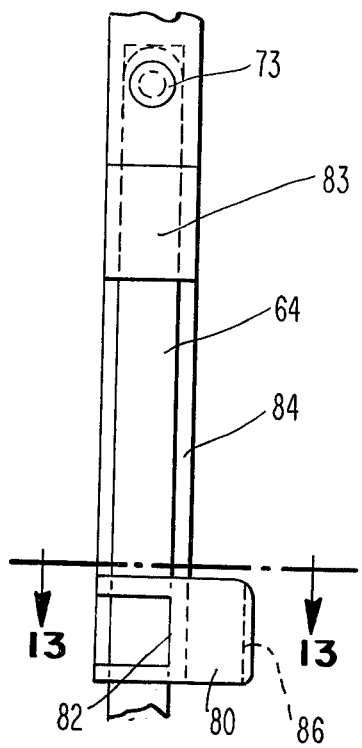
Fig. 11
Fig. 13
Fig. 12

VENT

This invention is related to air vents and in particular to vent structure for the housing or body of a van, camper, truck, construction vehicle, boat, or the like, the vent being mountable in the roof or side of the housing and in certain instances is provided with a window.

One object of the invention is to provide in vent means of the kind in question, a vent opening and closing system which is actuated by a single rotatable handle.

Another object of the invention is to provide in vent means of the kind in question, a vent opening and closing system employing a single, rotatable handle driving a double operator.

Another object of the invention is to provide in vent means of the kind in question, a vent opening and closing system employing hinge means and a single-handle double operator each of which is structured so that the vent can be quickly removed from the housing.

Another object to the invention is to provide in housing vent means of the kind in question, a vent frame rotated between open and closed positions by a double operator driven by a single rotatable handle, the frame and operator being structured to be quickly disconnected and reconnected by a person positioned inside the housing.

Another object of the invention is to provide in vent means of the kind in question, a disconnectable vent frame with a safety device to prevent accidental disconnection.

Another object of the invention is to provide in vent means of the kind in question, a vent frame rotatable between open and closed positions and which is supported so as to be securely held against rattling in any of such positions.

Another object of the invention is to provide in vent means of the kind in question, a hinge arrangement to rotatably mount a vent frame for movement between open and closed position which functions in a manner to insure the frame does not rattle in any position.

Another object of the invention is to provide in vent means of the kind in question, a vent frame rotatable between open and closed positions and which in the closed position develops pressure on a seal to ensure water-tight integrity.

Another object of the invention is to provide in housing vent means of the kind in question, a screen assembly covering the vent opening and positioned on the inside of the vent means in a manner so that the assembly can be removed and replaced by a person inside the housing.

Various of the advantages of the invention and the details of a preferred construction which may be employed, for example, in the roof of a vehicle such as a van, will be apparent from the description below taken in conjunction with the following drawings wherein;

FIG. 5 is a view taken along the lines 5—5 of FIG. 4 and illustrating the hinge of the invention;

FIG. 6 is an enlarged view taken along the lines 6—6 of FIG. 5 and showing the water seal and the hinge with the vent means in the closed condition;

FIGS. 7a and 7b are enlarged fragmentary views showing how the vent frame is disengaged;

FIG. 11 is a view taken along the lines 11—11 of FIG. 9 and illustrating the operation of the safety means;

FIG. 12 is a view taken along the lines 12—12 of FIG. 11;

FIG. 13 is a view taken along the lines 13—13 of FIG. 12;

Figure 1:
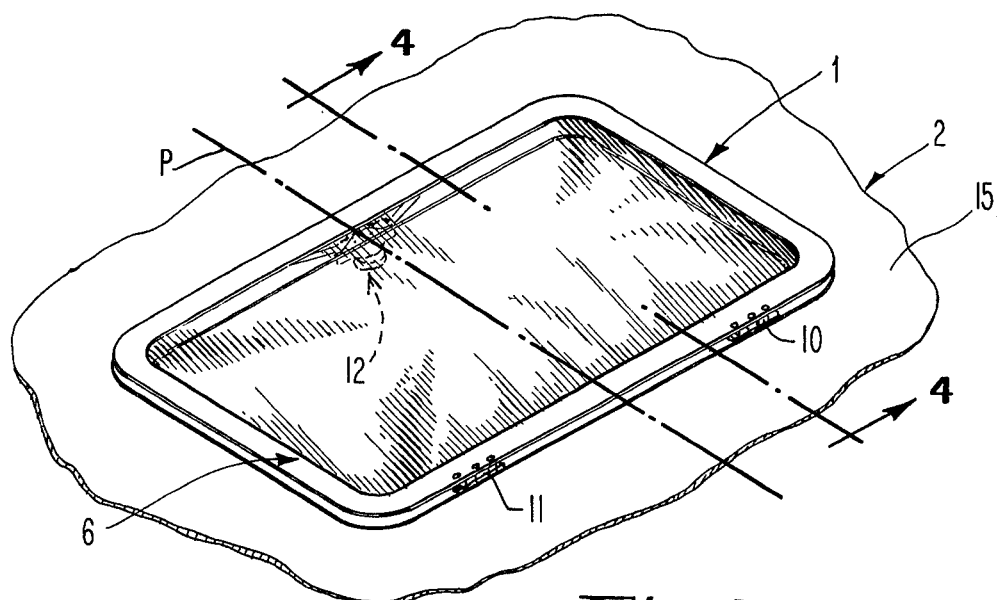
FIG. 1 is a perspective view of the vent means of the invention installed in a vehicle roof the vent means being in the closed condition.
Figure 2:
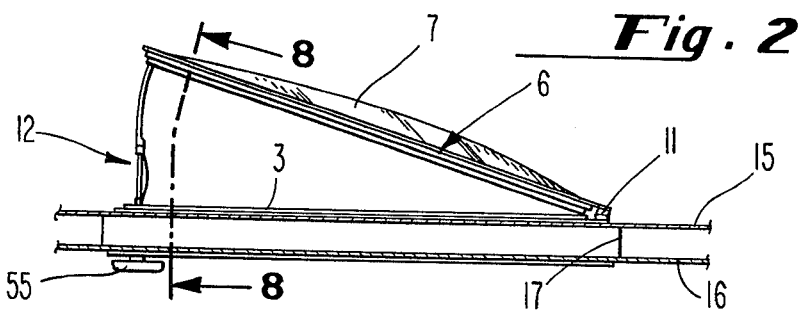
FIG. 2 is a side elevation of the vent means of FIG. 1 in the fully open condition.
Figure 3:
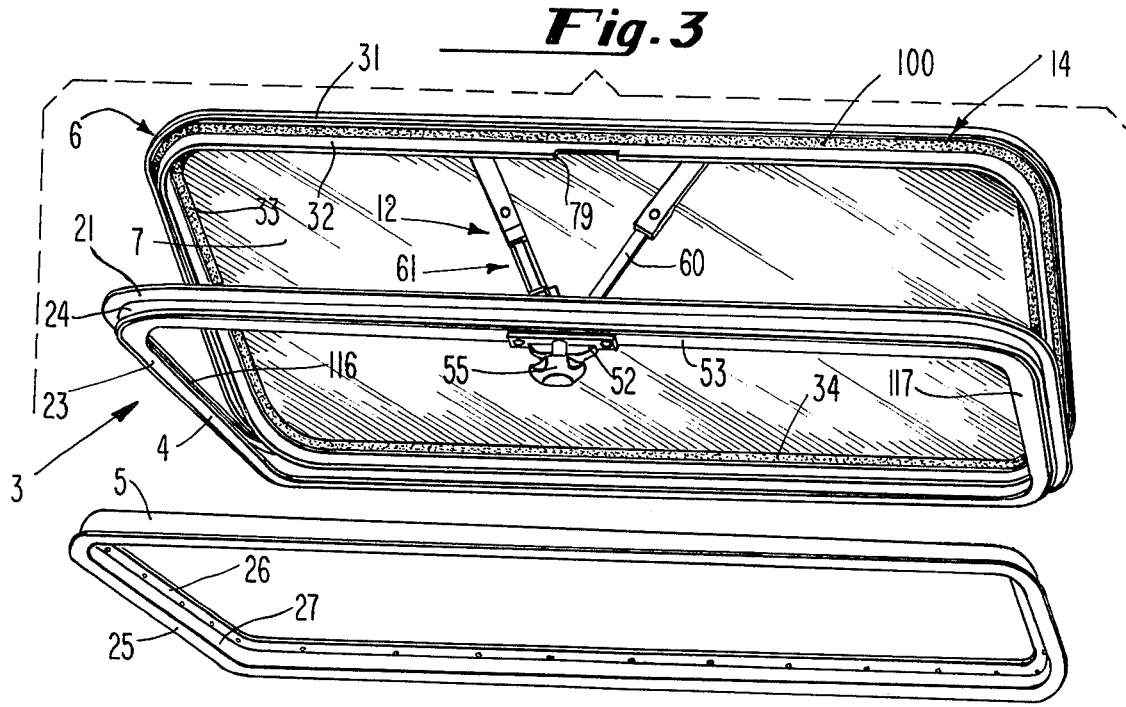
FIG. 3 is an exploded view of the vent means of FIG. 1 separated from the roof and in an open condition.

In FIG. 1, the generally rectangular shaped vent means 1 is mounted in the roof 2. The vent means has a mounting frame 3 (FIG. 3) comprised of the main frame 4 and the trim piece 5. The means also has a vent frame 6 which carries a closure 7. The vent frame 6 is rotatably mounted on the mounting frame 3 as by the hinges 10 and 11. The vent frame 6 and its closure 7 are moved by a single handle-double operator mechanism 12 as between the closed position as shown in FIG. 1 to open positions as indicated in FIGS. 2 and 3. The closure 7 may be transparent translucent, or opaque and formed of glass, plastic or metal and the like. The mounting frame 3 is adapted to removeably mount a screen assembly as noted at 13 in FIG. 4. In the closed position the vent means is made water-tight by the seal assembly 14.

Figure 4:
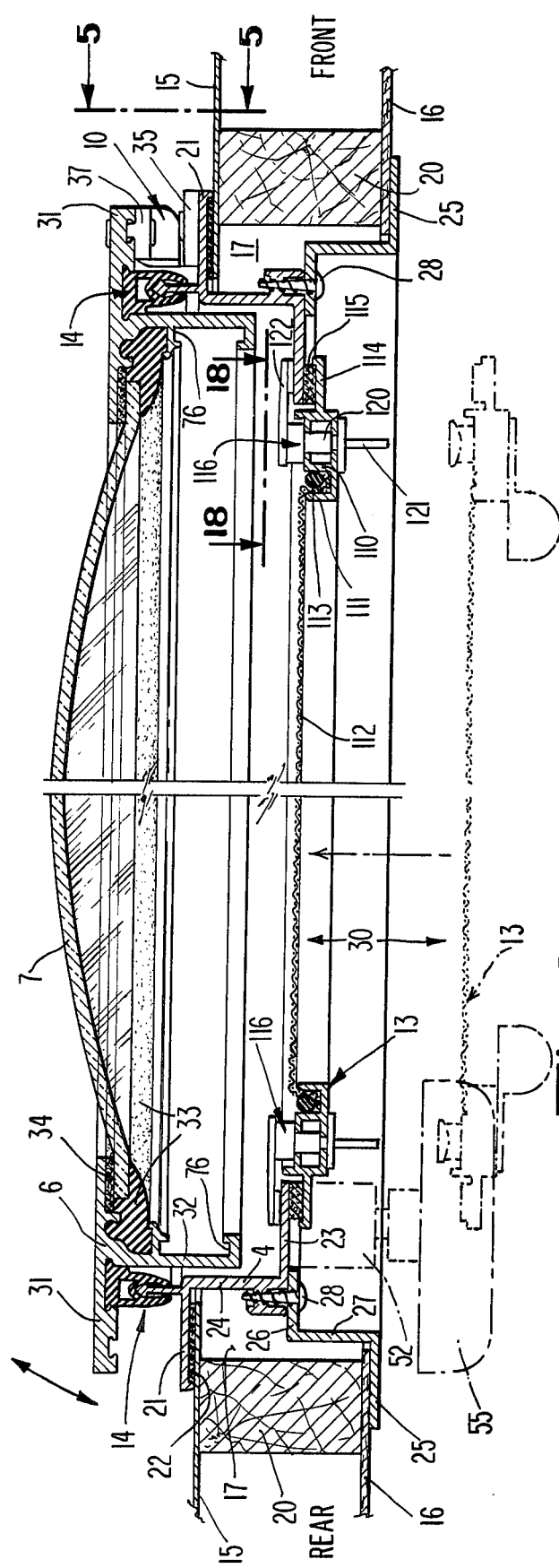
FIG. 4 is a sectional elevational view taken along the lines 4—4 of FIG. 1.

With reference to FIGS. 2 and 4, the roof 2 includes the top section 15 and the bottom section 16. Both sections of the roof are cut away to form a generally rectangular shaped aperture 17. Between the top 15 and bottom 16 are the spacers 20, there being one spacer on each of the four sides of the aperture 17.

The main frame 4 is Z-shaped across section. A leg 21 extends over and engages the roof top section 15. An appropriate sealing mastic 22 is disposed between the leg 21 and the top 15. The other leg of the frame 4 forms an inwardly projecting flange 23. The leg 21 and the flange 23 are connected by a cross piece 24 which extends down into the aperture 17. The leg 21, flange 23, and cross piece 24 form a continuous, annular shaped frame with linear sides and rounded corners.

The trim piece 5 is Z-shaped in cross section. A leg 25 extends under and engages the roof bottom section 16 while the other leg 26 engages the main frame 4. The legs 25 and 26 are connected by the cross piece 27 which extends up into the aperture 17. The legs 25 and 26 and the cross piece 27 form a continuous annular shaped frame with linear sides and rounded corners. The leg 26 is secured to the same as by the screws 28. The parts are dimensioned so that the legs 21 and 25 tightly press the roof sections 15 and 16 against the spacers 20 so as to securely hold the mounting frame 3 in the aperture 17.

From the foregoing it will be seen that the main frame has a continuous annular shape with linear sides and rounded corners. Also it will be observed that the mounting frame 3 forms a passageway 30 which provides communication between the inside and outside of the vehicle or other housing on which the vent means is used.

The vent frame 6 has a top flange 31 and a depending flange 32 extending down inwardly of the cross piece 24. The vent frame 6 carries the water-tight seals 33 and 34 which mount the closure 7. The flanges 31 and 32 form a continuous, annular shaped frame with linear sides and rounded corners.

Preferably, the frames 4, 5 and 6 are aluminum extrusions bent into the shapes illustrated with the free ends butted and joined by conventional means.

As previously mentioned, the hinges 10 and 11 provide for the vent frame to be opened and closed as determined by the operator mechanism 12. The hinges have several important advantages, for example, they hold the vent frame against rattling, they impose forces on the vent frame so as to obtain an effective seal and they permit the vent frame to be easily disconnected by a person standing inside the housing. The structure of the hinges will next be described.

The hinges 10 and 11 are identical in construction and an explanation will be made in connection with the hinge 10 which is best detailed in FIGS. 5, 6 and 7.

The hinge includes the guide member 35 fixed to the flange 21 of the mounting frame 3 as by rivets 36 and also has a follower 37 fixed to the flange 31 of the vent frame 6 by the rivets 38. The follower is located on the vent frame flange 31 by the keykeyway 39. The follower 37 is rotatably mounted on the guide 35 and this provides for rotation of the vent frame with respect to the mounting frame. The manner in which the follower is rotatably mounted on the guide is next explained.

The guide and follower have two operating sections both of which are identical. One section is indicated at 40 and the other section is indicated at 41. The section 41 will be described.

The guide 35 includes the base 42 which is engaged with the flange 21 of the mounting frame 3 and carries the rivets 36. The base has a cutout section 43 and the areas 44 and 45 on opposite sides of the cutout 43 form a lower grip means, Extending upright from the base at the innermost side the cutout 43 (FIG. 6) is an arcuately shaped upper grip 46. The grip extends outwardly and over the lower grip 44-45.

The follower 37 has a base 47 which engages the flange 31 of the vent frame 6 and carries the rivets 38. The base has a pair of downwardly extending sections 48 and 49 which carry a circular shaft 50.

The shaft 50 is caught between the lower grip 44-45 and the upper grip 46. The inner periphery of the grip 46 includes a circular section to correspond to the circular shape of the shaft 50. The shaft 50 and grips 44-45 and 46 make a snug sliding fit.

A keeper 51 extends downwardly from follower base 47 and engages the outer perpheral surface of the grip 46. The grip 46 is caught between the follower shaft 50 and the follower keeper 51. The engaging surfaces of the grip 46 and keeper 51 are arcuately shaped and make a snug, sliding fit. These surfaces engage over a substantial segment of follower rotation but are shaped to disengage as explained later on. Preferably the guide and follower are molded from Lexan brand plastic which provides a firm, strong unit. The snug, sliding fit of the parts secures the follower 37 and vent frame against radial movement. The non-radial characteristic and the plastic material cooperate to prevent rattle of the vent frame. The anti-rattle condition pertains in the closed and in any of the open positions.

As mentioned above the hinges permit the vent frame 6 and its closure 7 to be disengaged from the mounting frame 3. I will now explain how this is accomplished.

First, the vent frame 6 is disconnected from the operator mechanism 12 so it can be rotated to the disconnect position. The vent frame is then rotated to a position as shown by the dotted lines in FIG. 7a. In this position the engaging surfaces of keeper 51 and grip 46 are separated while the shaft 50 remains between the upper and lower grips. Now then, if the vent frame 6 is moved (toward the right hand side as viewed in FIG. 7a) the end of the grip 46 will yield and permit the shaft 50 to snap out of position. This action will disengage the vent frame as shown in FIG. 7b.

To replace the vent frame, the same is brought into the orientation of FIG. 7b and moved so the shaft 50 brought between the upper and lower grips. Then the bottom of the frame is pulled to the left so that the shaft 50 snaps into position between the grips.

The above described manipulation of the vent frame is accomplished by a person standing inside of the housing. The arms extend thru the passageway 30 so that the hands can grip the opposite sides of the vent frame.

While I have shown the hinges as comprising two operating sections, i.e. section 40 and 41, it will be understood that the invention contemplates that the hinges may comprise a single operating section. In many instances this is desirable. Where a roof has a transverse curvature the single operating section hinge eliminates any bending action that might otherwise occur in a double section hinge.

The details of the operating mechanism 12 will be described below, particularly with reference to FIGS. 8 thru 13. The operator mechanism has several important features. A single handle driving a pair of operating arms opens and closes the vent frame 6 with a few twists of one hand. This eliminates back and forth hand motion which is necessary in the double handles which are conventionally employed in vents of the kind described. Furthermore, the double arms enable the development of forces on the vent frame to enhance the sealing function of the seal assembly 14.

Figure 8:
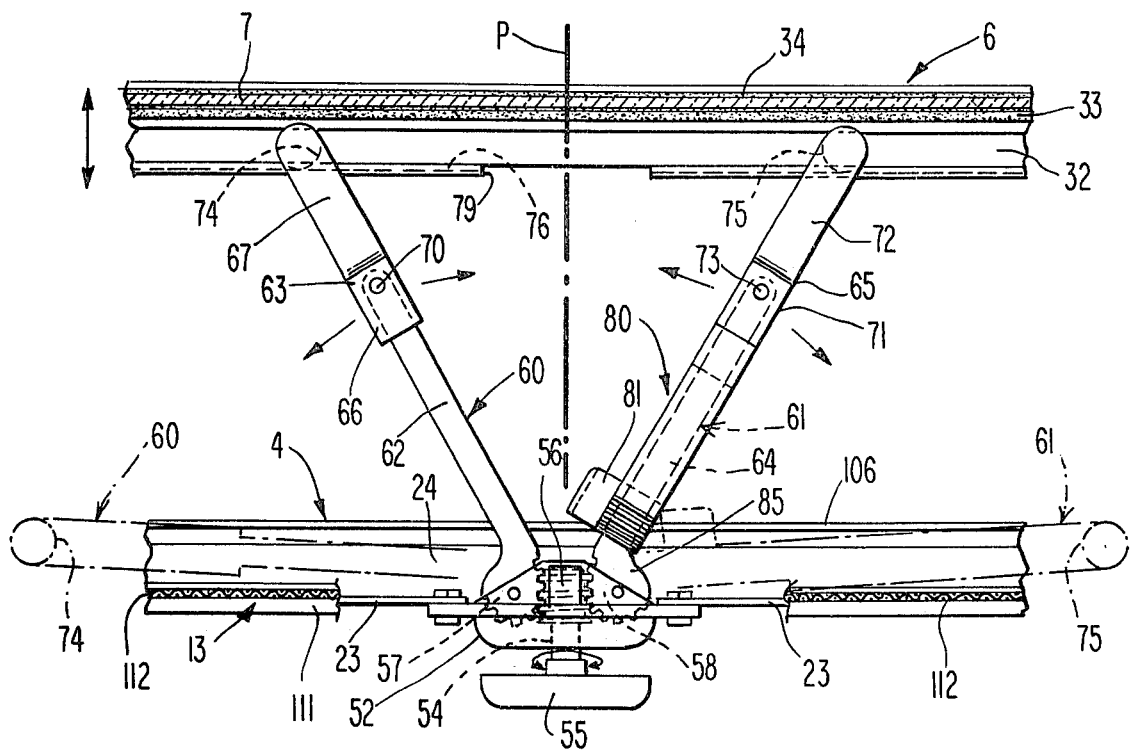
FIG. 8 is a view taken along the lines 8—8 of FIG. 2 and showing the single handle-double operator system.

Refering to FIG. 8, a housing 52 is connected to the side 53 of the main frame 4. The housing rotatably mounts a shaft 54 carrying a handle 55 at one end and a worm 56 at the other end. A pair of worm wheels 57 and 58 are rotatably connected to the side 53 and mesh with the worm 56. The worm wheels form the lower ends of the operating arms 60 and 61. When the handle is turned, the worm wheels and arms rotate in opposite directions as noted by the arrows.

The arm 60 has a lower section 62 (on which the worm wheel 57 is formed) and an upper section 63. The arm 61 has a lower section 64 (on which the worm wheel 58 is formed) and an upper section 65. The upper section 63 includes the socket 66 and the compensator 67. The scoket is mounted on top of the lower section 62 and is secured as by the rivet 70. The upper section 65 includes the socket 71 and compensator 72. Socket 71 is mounted on the top of the lower section 64 and held in position by the rivet 73.

The top of the compensator 67 includes a rider 74 and the top of the compensator 72 includes a rider 75. The riders operate in the track 76 formed in the vent frame 6.

Figures 9, 10:
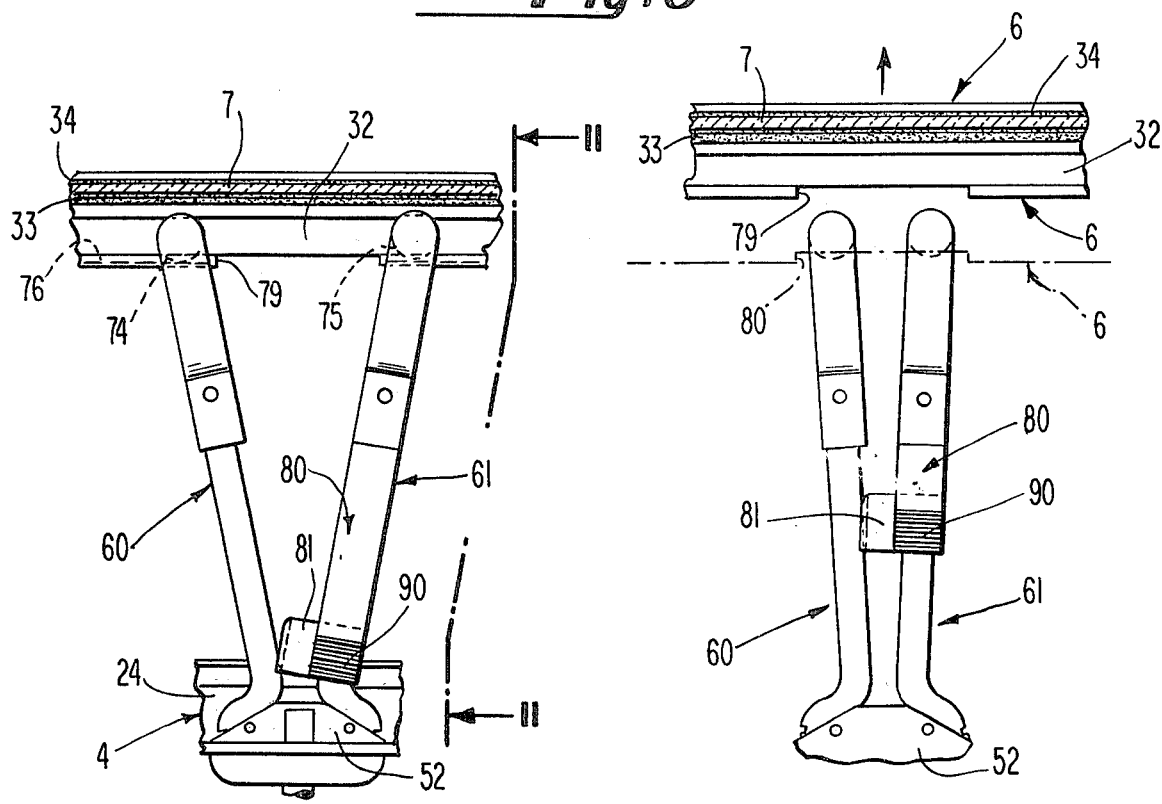
FIG. 9 is a view of the operator of FIG. 8 and showing one form of safety means to prevent accidental disengagement.
FIG. 10 is a view of the operator of FIG. 9 where the safety means has been relocated so disconnection can be effected.

When the handle 55 is turned so that the operating arm 60 and 61 are rotated toward one another the riders 74 and 75 slide along the track 76 toward each other and cause the vent frame 6 to move upwardly away from the mounting frame 3. The position of the arms operating 60 and 61 for the fully open position of the vent frame 6 is indicated in FIG. 9. When the handle 55 is turned so that the operating arms 60 and 61 are rotated away from one another the riders 74 and 75 move the vent frame 6 down towards the mounting frame 3 to the closed position. The location of the arms 60 and 61 for the closed position is shown by the dotted lines in FIG. 8. It will be understood of course, that the handle 55 can be manipulated to place the operating arms in any intermediate position so that the vent frame is partially open.

As previously mentioned the process of removing the vent frame 6 requires the operator mechanism 12 to be first disengaged from the vent frame. This is accomplished by rotating the handle 55 so that the operating arms 60 and 61 position the riders 74 and 75 within an opening 79 in the track 76 and then manually pushing the vent frame 6 upwardly so that the riders slip thru the opening and disengage from the track. In connection with disconnection of the operating mechanism, the invention provides safety stop means to that the handle 55 cannot be rotated to inadvertantly place the riders within the opening 79. One means for accomplishing this is shown in FIG. 8-13.

A safety stop assembly 80 includes an abutment 81 located so that at predetermined rotational positions of operating arms 60 and 61 the abutment will engage both arms and accordingly stop rotation.

Preferably, rotation of the operating arms is stopped when the riders 74 and 75 are closely adjacent the opposite ends of the opening 79 as indicated in FIG. 9. (As previously noted this is the fully open position of the vent frame).

The abutment 81 then can be moved or relocated so as to permit further rotation of the arms toward one another to place the riders 74 and 75 within the opening 79. With reference to FIG. 10 it will be seen the abutment 81 has been relocated upwardly on the arm 61. This has permitted the arms 60 and 61 to be rotated close together so that the riders 74 and 75 are as well within the area of the opening 79 and thus permitting the vent frame 6 to be rotated upwardly so that the riders slip thru the opening 79.

To reconnect the vent frame 6 and the operator 12, the vent is rotated down until the riders 74 and 76 slip thru the opening 79 and then the handle 55 is turned so that operating arms 60 and 61 move away from one another so that the riders engage with the track. The abutment then is relocated to the position as shown in FIG. 9.

The manner in which the safety stop assembly 80 locates and relocates the abutment 81 will next be described.

Referring to FIG. 11, the safety stop assembly 80 includes the slider 82 (carrying abutment 81) slider 83 and yieldable strap 84. The sliders 82 and 83 are slidably mounted on the lower section 64 of the arm 61. The strap 84 pushes the slider 82 down against the shoulder 85 of the lower end of the section 64 and pushes the slider 83 up against the socket 71. This action maintains the abutment 81 in position of FIG. 9. Preferably the abutment 81 has a recess 86 (FIG. 13) which accepts the lower section 62. In certain instances it may be desirable to connect the assembly 80 with the upper section 65 and for such purposes a hook arrangement as shown at 87 may be employed.

The abutment 81 is relocated simply by sliding the slider 82 up along the lower section 64 to the position as shown in FIG. 10. This is accomplished (see FIG. 11) by pushing upwardly on the serrated surface 90 with the index finger 91. The flexible strap 84 accommodates the upward motion by assuming the position shown in the dotted lines.

Another form of safety stop is shown in FIGS. 14 thru 17.

Figure 14:
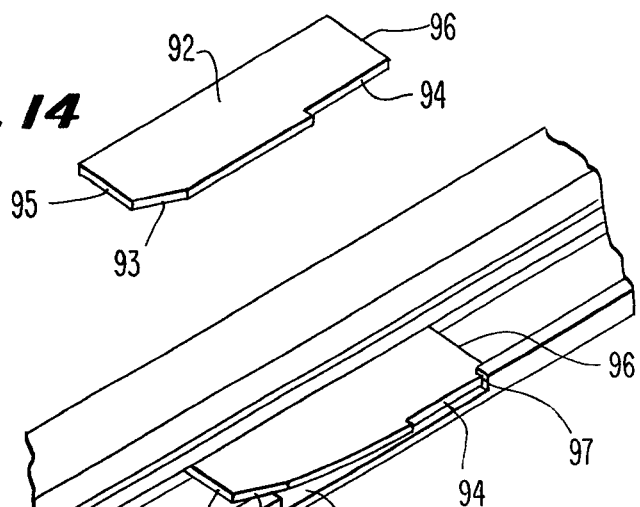
FIG. 14 is a perspective view of an alternative form of safety means.

Refering to FIG. 14, an abutment or strip 92 is generally rectangular in shape and has tapered section 93 and cut-out section 94. The width of the strip is slightly less than the width of track 76 so that the strip can be slipped in and out of the track. The length of the strip is slightly greater than the width the opening 79. The ends 95 and 96 are adapted to be engaged by the riders 74 and 75.

Figure 15:
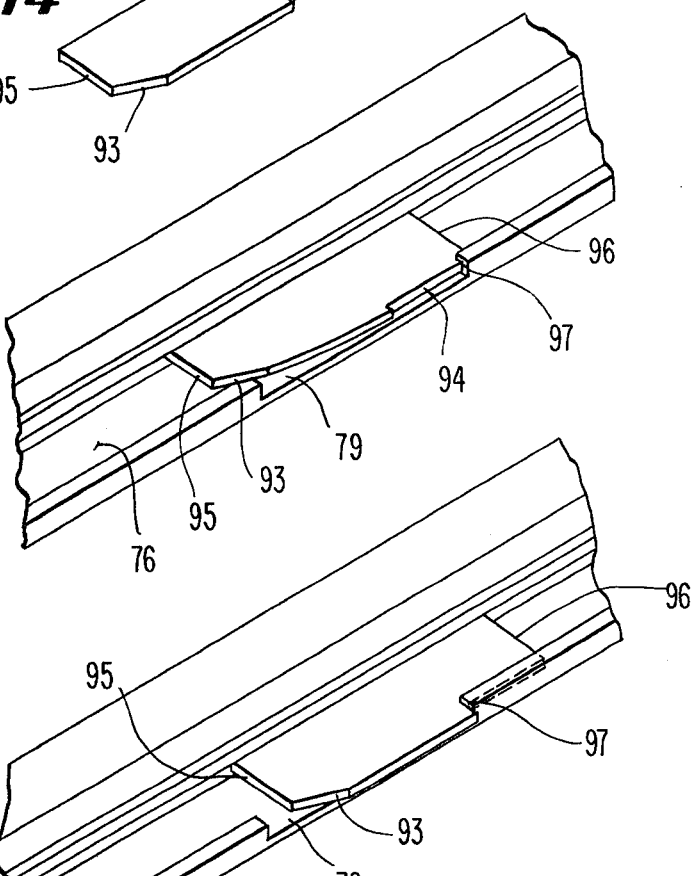
FIGS. 15, 16 and 17 illustrate how the safety means of FIG. 14 is employed.
Figure 16:
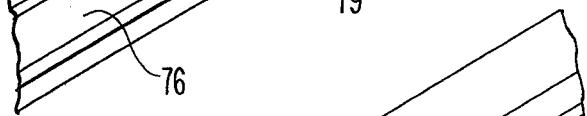

Referring to FIG. 15, the strip is placed on the track 76 over the opening 79 so that the end 96 is inserted as shown. The strip is then moved to the right until the cut-out section engages the end 97 of the opening 79, as in FIG. 16. The strip is then moved back to the left until the tapered section engages the end 98 of the opening as in FIG. 17. This locates the strip 92 in the track 76 in the desired position. It will be apparent that when the strip 92 is positioned as shown in FIG. 16 and the end 96 is engaged by the rider 76 the tapered section 93 will tightly butt against the edge 98 and so stop the motion of rider 75 and consequently arm 61. This also stops the motion of arm 60 since it is connected to arm 61 via the worm drive.

The strip 92 can quickly be moved out of the track for purposes of disconnecting the vent frame 6 and operating mechanism 12. To remove the strip 92, the operating arms 60 and 61 are moved so that the rider 75 is spaced away from the edge 96 to an extent that the strip can be moved to the position as shown in FIG. 16. The strip is then raised and slipped out thru the opening 79.

The details of seal assembly 14 for providing a continuous water seal between the vent frame 6 and mounting frame 3 will next be described.

As particularly noted in FIG. 11, an extruded flexible member 100 made from rubber or plastic is fixed adjacent the outer periphery of the flange 31 of the vent frame 6. The extrusion 100 has an "H" shaped cross section which is formed as by the walls 102, and 103 and the cross piece at 104. The extrusion also has an open center section 105. With reference to FIGS. 4 and 6 mounting frame 3 carries an annular seal wall 106 extending around the frame adjacent the passageway 30.

When the vent frame 6 is any open position, the parts of the extrusion 100 assume the shape as indicated in FIG. 11. When the vent frame 6 begins to move down to the closed position, the seal wall 106 enters the cavity 101 and contacts the cross piece 104. With further downward motion, the seal wall 106 causes the cross piece to deform so that the cavity walls 101 and 102 move closer together. In the fully closed position (FIG.

6), the cavity walls 102 and 103 engage opposite sides of the seal wall 106. The engagement between the member 100 and the seal wall 106 forms a continuous water-tight seal around the passageway 30. To enhance continuity of the seal, the member 100 and seal wall 106 are both located inboard of the hinges 10 and 11.

The seal assembly 14 is advantageous in that it permits relaxed dimensioned tolerances for vent frame 6 and mounting frame 3 and in the precision required for the location of hinge 10 and 11. This helps to reduce fabricating and assembly costs. In the event the mounting frame and the vent frame are not aligned to attain the ideal condition of the seal as illustrated in FIG. 6, the seal wall 106 may enter the cavity 101 off center or toward wall 102 or 103. In some cases the extrusion 100 may be deformed so that a two part seal is effected that is to say an engagement between the top of the wall 106 and the cross piece 104 and an engagement between wall 102 or 103 with seal wall 106. In an unusal but possible case, only the top of the wall 106 and the cross piece 104 may engage. In any event, either single or multiple engagements will provide the necessary water tight condition.

One of the advantages of the invention is that the vent frame 6 imposes forces on the member 100 so that the sealing effect is continuous around the periphery of the passageway and so that the sealing effect is not interrupted by rattle or vibration of the vent frame. Such an effect is necessary to insure the water-tight integrity of the seal. The hinges 10 and 11, and the riders 74 and 75 impose the necessary force.

With respect to FIG. 1 it will be seen that the hinges 10 and 11 are symmetrically disposed on opposite sides of the plane P which bisects the vent frame 6 and the mounting frame 3. Also, with reference to FIG. 8 it will be observed that in the closed position the riders 74 and 75 are symmetrically disposed on opposite sides of the plane P and preferably at outboard locations which correspond to the hinge locations.

The seal assembly 14, the vent frame 6 and hinges 10 and 11 are dimensioned so that in the closed position a substantial downward pressure is developed between the seal 100 and the wall 106. Likewise, the handle 55 is turned so that the riders 74 and 75 are down firm against the vent frame and exert downward pressure thereon which is transferred to the seal 100 and wall 106. Thus, the vent frame being held down against seal 100 is prevented from rattling or otherwise moving and the continuity of the seal is maintained.

Furthermore, the riders make a snug, sliding fit in the track and this condition holds the vent frame against vibration. The riders being made of plastic material further minimizes the chance of vibration.

Another important feature of the invention is the provision of a screen for the passageway which can be installed or removed by a person inside of the housing. A preferred construction will be explained in connection with FIGS. 4, 18, 19 and 20.

The screen assembly 13 includes annular shaped frame 110 having socket 111 within which the screen 112 is held as by the flexible bead 113. The frame 110 has an outboard peripheral flange 114 which extends around the frame so as to be vertically alignable with the flange 23 of the mounting frame as shown. A flexible seal 115 is disposed between the flange 23 and 114. The flange 23 and seal 115 form seat means on the mounting frame 3.

The screen assembly is removeably held in the position on the mounting frame 3 as by the latch mechanisms 116. Preferably, there are four such mechanisms, two for side 117 and two for side 118 of the mounting frame.

The latch mechanisms are identical in construction as described following.

Figure 18:
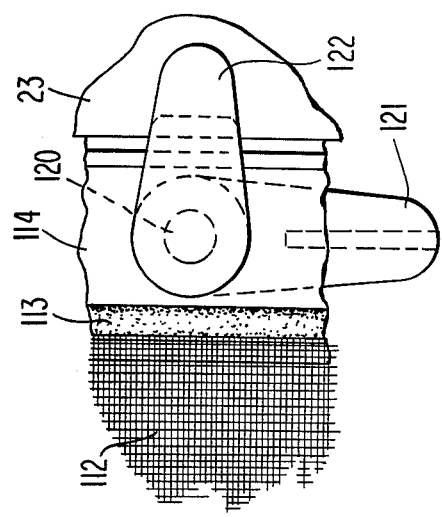
FIG. 18 is an enlarged plan view taken along the lines 18—18 of FIG. 4 and illustrating the screen latching mechanism in the locked position.
Figure 17:
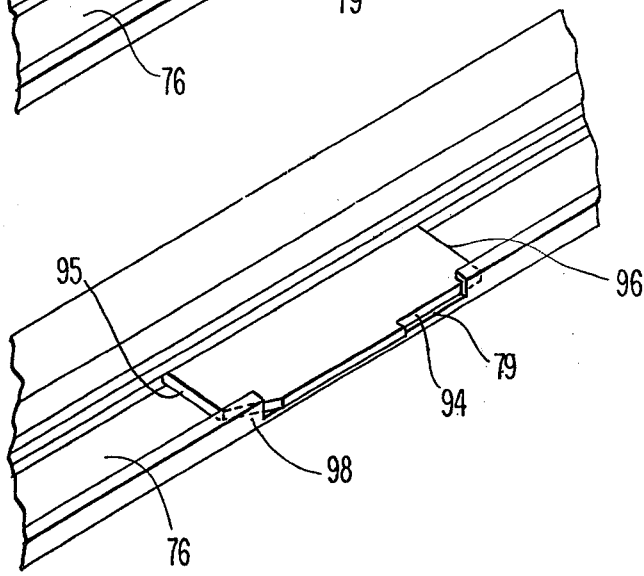

Each latch mechanism 116 includes a shaft 120 which is rotatably mounted on the screen frame 110. On the underside, the shaft fixedly supports an operating knob 121. On the top side the shaft fixedly supports a keeper 122. The shaft can be turned by the knob 121 which causes the keeper 122 to turn. The keeper can be turned as between a locked position as shown in FIG. 17 to an unlocked position as shown in FIG. 18. In the locked position the keeper extends over and engages the flange 23. In the unlocked position the keeper is disengaged from the flange 23.

Figure 19:
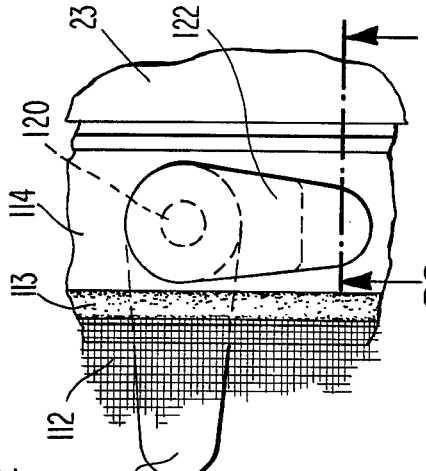
FIG. 19 is a view similar to FIG. 18 illustrating the latching mechanism in the unlocked position.
Figure 20:
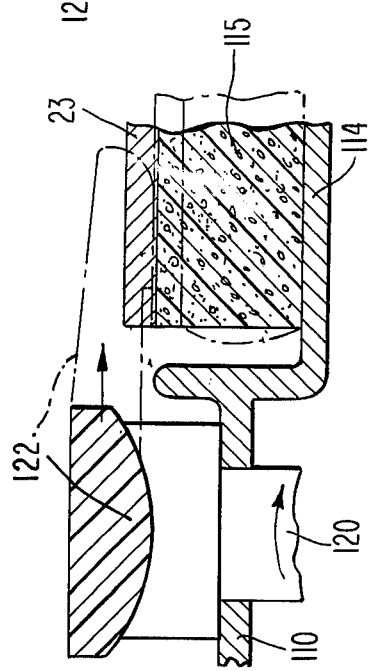
FIG. 20 is a view taken along the lines 20—20 of FIG. 19.

The parts are dimensioned so that when the keeper moves into the locked position the flange 114 compresses the seal 115 against the flange 23 (see FIG. 19). Sufficient pressure is generated to prevent the screen assembly from vibrating or rattling. Moreover, the seal is continuous around the periphery of the flanges and thus prevents insects from entering the housing.

It will be noted the latch mechanisms are located inboard of the seal 115 and this maintains continuity of the seal.

Preferably the seal 115 is secured to the flange 114 as by a suitable mastic so that when the screen assembly is removed the seal remains on the flange 114.

It will be apparent from inspection of FIG. 2 that the latch mechanisms 116 and screen assembly 13 are substantially spaced from the vent frame 6 so as to offer no interference to the motion of the frame between the open and closed positions. Also, it will be seen that a person inside the housing can operate the latch mechanisms 116 and position and remove the screen assembly 13.

I claim:

1. Improved vent means for a housing comprising;
   an annular shaped mounting frame having mechanism for fixedly connecting the frame in an aperture of a housing, the mounting frame forming a passageway to provide for communication between the inside and outside of the housing;
   an annular shaped vent frame carrying a closure;
   hinge means disposed on one side of the mounting frame and having a guide section fixed to the mounting frame and a follower section fixed to the vent frame and the guide and follower being snugly, slidingly engaged and the mounting frame, the vent frame and the hinge means each being symmetrically disposed with respect to a plane bisecting said one side;
   said engagement between the guide section and follower section supporting the vent frame for rotation with respect to the mounting frame about an axis normal to said plane as between a closed position wherein the vent frame and closure close off said passageway to any of a plurality of open positions wherein the vent frame and closure open said passageway;
   a continuous annular seal wall on the said mounting frame;
   a continuous flexible seal on said vent frame and extending around adjacent the outer periphery of the vent frame;

a handle rotatably mounted on said mounting frame and positioned to be accessible from the interior of the housing when the vent means is installed in said aperture;

a pair of operating arms respectively rotatably mounted on said mounting frame;

drive means connected between said handle and said arms and providing that rotation of handle simultaneously rotates said arms in opposite directions;

a track on said vent frame;

each arm supporting a rider, the rider being mounted in said track and making a snug, sliding fit therewith and rotation of the operating arm moving the rider along the track to cause the vent frame and closure to rotate about the hinge means as between said closed and open positions and in the closed position the riders respectively being symmetrically disposed with respect to said plane;

each said operating arm having means providing for the arm to be rigid in the direction of arm rotation and flexible in a direction normal to the rotational direction;

in the closed position, said seal engaging said seal wall to form a water seal;

the riders and hinge means being disposed whereby in the closed position the riders and hinge means exert forces on the vent frame symmetrical with respect to said plane to cause said engagement between the seal and seal wall to be continuous and to prevent rattle of the vent frame; and in any of said open positions said snug, sliding fit of the hinge means and of the riders supporting the vent frame to prevent rattle thereof.

2. The vent means of claim 1 further including;

opening means in said track dimentioned to provide for each rider to move therethru;

abutment means moveable to a location to stop rotation of the arms in positions wherein the respective riders are spaced from said opening means and moveable to another location wherein the arms can be moved to place the riders within the opening means so that manual rotation of the vent frame and closure about said hinge causes the riders to move thru the opening means and disengage from said track.

3. The vent means of claim 2 wherein:

said abutment includes a slider slidingly mounted on one operating arm and a resilient strap connected between said one operating arm and said slider, the strap normally biasing the slider in a position to engage the other arm so as to stop motion of the arms toward each other and permitting the slider to be manually moved along the arm to a location providing for operating arms to be moved toward each other to place the riders within said opening means.

4. The vent means of claim 2 wherein said abutment means includes at least one abutment which can be disposed in or removed from said track.

5. The vent means of claim 2 wherein said abutment means is an elongated strip configured to be slipped thru said opening to rest in the track and fixedly position one end for engagement with one of said riders and which can be slipped thru said opening for removal from the track.

6. The vent means of claim 1 wherein said means providing for the arms to be rigid in the direction of rotation and flexible in a direction normal to the rotational direction includes for each arm:

a rigid lower member one end of which is connected to said drive means;

an upper member having a socket section and a compensator section;

the other end of the lower member extending into and engaging said socket section and means securing the socket section to the lower member, the socket section providing for the upper member to rotate with the lower member;

the compensator section being made of a material and having a cross section which conditions the compensator to be rigid in the direction of arm rotation and flexible in the normal direction; and the compansator section carrying said rider adjacent its outer end.

7. The vent means of claim 6 wherein the upper member is formed of plastic and the means securing the socket section is a rivet.

8. The vent means of claim 6 further including:

opening means in said track dimensioned to provide for each rider to move therethru; and an abutment including a slider slidingly mounted on one operating arm and a resilient strap connected between said socket section and said slider, the strap normally biasing the slider in a position to engage the other arm so as to stop motion of the arms toward each other and permitting the slider to be manually moved along the arm to a location providing for operating arms to be moved toward each other to place the riders within said opening means.

9. The vent means of claim 1 further including:

seat means on said mounting frame;

an annular screen frame supporting a screen and adapted to be placed on or removed from said seat means, the seat means and the frame providing that when the frame is positioned on the seat, the screen extends across said passageway and the screen and frame being spaced from said vent frame so that same can rotate between open and closed positions without interference from the screen frame and screen;

manually operably latch mechanism removeably securing the screen frame on said seat means; and the seat means and the latch mechanism both being located whereby the screen can be placed on and removed from the seat means from inside the housing and latch mechanism can be operated from inside the housing.

10. The vent means of claim 9 wherein;

said seat means includes an annular flange located adjacent the inner periphery of the mounting frame and a resilient seal on the flange and said screen frame has a peripheral flange engaging said seal and said latch mechanism is located on said screen frame inboard of last said seal and the engagement of said seal with said flanges preventing rattle of the screen and the entry of insects between the flanges.

11. The vent means of claim 10 wherein said latch mechanism includes;

a shaft extending thru and rotatably mounted on said screen frame;

a knob on the underside of the screen frame and connected to the shaft for rotating the same; and a keeper mounted on said shaft for rotation therewith, the keeper being rotatable by the knob to a lock position wherein the keeper engages the top of said mounting frame flange and draws said flanges tightly against the resilient seal and being rotatable to an unlock position wherein the keeper is free from the mounting frame flange to provide for removal of the screen frame and screen.

12. The roof vent of claim 1 wherein:

said guide includes upper grip means and lower grip means; and said follower includes:
 (a) a shaft disposed between the upper and lower grip means in snug sliding engagement therewith;
 (b) a keeper disposed over the outer periphery of the upper grip means in a snug, sliding engagement therewith, the engagement being over a substantial segment of follower rotation to prevent relative radial motion between shaft and grip means whereby to maintain the shaft between the grip means but to disengage from said outer periphery at a predetermined rotational position of the follower whereby the shaft can be moved radially to disconnect the shaft from the grips, said disconnection providing for removal of the vent frame and closure from the main frame.

13. Improved vent means for a housing comprising;

annular shaped mounting frame means having mechanism for fixedly connecting the frame means in an aperture of a housing, the mounting frame means forming a passageway to provide for communication between the inside and outside of the housing;

hinge means connected to the mounting frame outboard of said passageway;

annular shaped vent frame means carrying a closure and fixedly connected to the hinge means, the hinge means mounting the vent frame means for rotation with respect to the mounting frame means as between a closed position wherein the vent frame means and the closure close off said passageway to any of a plurality of open positions wherein the vent frame means and the closure open said passageway;

seat means on said mounting frame means including an annular flange extending into said passageway and an annular, flexible seal extending around and on the underside of the annular flange;

an annular screen frame supporting a screen, the frame having an outboard, peripheral flange dimensioned to be vertically aligned with said annular flange to engage said flexible seal and thereby be positioned on the seat and in said position the screen extending across said passageway and the screen and frame being spaced from said vent frame means so that same can rotate between open and closed positions with out interference from the screen frame and screen;

a plurality of manually operably latch mechanisms respectively mounted on said screen frame outboard of the screen and inboard of the flexible seal for removeably securing the screen frame on said seat means; and the seat means and the latch mechanism both being located whereby the screen frame can be placed on and removed from the seat means from inside the housing and latch mechanism can be operated from inside the housing and the location of the latch mechanisms and the engagement of the seal with the flanges preventing rattle of the screen and entry of insects between the flanges.

14. The vent means of claim 13 wherein said seal is secured to said outboard peripherial flange to be removeable with the screen frame.

15. The vent means of claim 13 wherein each said latch mechanism includes;

a shaft extending thru and rotatably mounted on said screen frame and located between the screen and the flexible seal;

a knob on the underside of the screen frame and connected to the shaft for rotating the same; and a keeper mounted on said shaft for rotation therewith, the keeper being rotatable by the knob to a lock position wherein the keeper engages the top of said mounting frame annular flange and draws said flanges tightly against the resilient seal and being rotatable to an unlock position wherein the keeper is free from the mounting frame annular flange to provide for removal of the screen frame and screen.

16. Improved vent means for a housing comprising;

annular shaped mounting frame means having mechanism for fixedly connecting the frame means in an aperture of a housing, the mounting frame means forming a passageway to provide for communication between the inside and outside of the housing;

hinge means connected to the mounting frame;

annular shaped vent frame means carrying a closure and fixedly connected to the hinge means, the hinge means mounting the vent frame means for rotation with respect to the mounting frame means as between a closed position wherein the vent frame means and the closure close off said passageway to any of a plurality of open positions wherein the vent frame means and the closure open said passageway;

a handle rotatably mounted on said mounting frame means and positioned to be accessible from the interior of the housing when the vent means is installed in said aperture;

a pair of operating arms respectively rotatably mounted on said mounting frame means;

drive means connected between said handle and said arms and providing that rotation of handle simultaneously rotates said arms in opposite directions;

each said operating arm having means providing for the arm to be rigid in the direction of arm rotation and flexible in a direction normal to the rotational direction;

a track on said vent frame means;

each arm supporting a rider, the rider being mounted in said track and making a snug, sliding fit therewith and rotation of the operating arm moving the rider along the track to cause the vent frame means and closure to rotate about the hinge means as between said closed and open positions;

opening means in said track dimensioned to provide for each rider to move therethru; and abutment means moveably to a location to stop rotation of the arms in positions wherein the respective riders are spaced from said opening means and moveably to another location wherein the arms can be moved to place the riders within the opening means so that manual rotation of the vent frame means and closure about said hinge causes the riders to move thru the opening means and disengage from said track;

said abutment including a slider slidingly mounted on one operating arm and a resilient strap connected between said one operating arm and said slider, the strap normally biasing the slider in a position to engage the other operating arm so as to stop motion of the operating arms toward each other and permitting the slider to be manually moved along the operating arm to a location providing for operating arms to be moved toward each other to place the riders within said opening means.

17. The vent means of claim 18 wherein said means providing for the arms to be rigid in the direction of rotation and flexible in a direction normal to the rotational direction includes for each arm:

a rigid lower member one end of which is connected to said drive means;

an upper member having a socket section and a compensator section, the compensator section carrying said rider adjacent its outer end and the upper member being molded from plastic material so that the socket, compensator and rider are integral;

the other end of the lower member extending into and engaging said socket section and means securing the socket section to the lower member, the socket section providing for the upper member to rotate with the lower member;

the compensator section having a cross section which cooperates with the plastic material to condition the compensator to be rigid in the direction of arm rotation and flexible in a direction normal to the rotational direction.

18. The vent means of claim 17 wherein the means securing the socket section is a rivet.

* * * * *